United States Patent
Langlois et al.

(10) Patent No.: US 7,312,945 B2
(45) Date of Patent: Dec. 25, 2007

(54) TECHNIQUES FOR ADJUSTING FOR ACTUATOR NON-LINEARITIES IN A DATA STORAGE SYSTEM

(75) Inventors: Denis J. Langlois, River Falls, WI (US); James S. Anderson, Hugo, MN (US)

(73) Assignees: Imation Corp., Oakdale, MN (US); Sony Corporation, Tokyo (JP)

(*) Notice: Subject to any disclaimer, the term of this patent is extended or adjusted under 35 U.S.C. 154(b) by 353 days.

(21) Appl. No.: 11/062,224

(22) Filed: Feb. 18, 2005

(65) Prior Publication Data

US 2006/0186756 A1    Aug. 24, 2006

(51) Int. Cl.
*G11B 5/58* (2006.01)
*G11B 5/584* (2006.01)

(52) U.S. Cl. .............. 360/77.01; 360/78.05; 360/77.16; 360/77.12; 360/78.02

(58) Field of Classification Search .............. None
See application file for complete search history.

(56) References Cited

U.S. PATENT DOCUMENTS

| | | | |
|---|---|---|---|
| 4,689,514 A * | 8/1987 | Kondoh et al. ........ | 310/323.21 |
| 6,034,834 A * | 3/2000 | Yoshikawa et al. ........... | 360/75 |
| 6,760,180 B2 * | 7/2004 | Kino et al. ................. | 360/75 |
| 7,253,987 B1 * | 8/2007 | Shim et al. .............. | 360/77.02 |
| 2005/0185344 A1 | 8/2005 | Ito et al. | |
| 2005/0201017 A1 | 9/2005 | Koga et al. | |

OTHER PUBLICATIONS

Co-pending U.S. Appl. No. 11/051,371, filed Feb. 3, 2005, Anderson et al., entitled "Piezoelectric Crystal Actuator and Techniques for Hysteresis Reduction".

* cited by examiner

*Primary Examiner*—William R. Korzuch
*Assistant Examiner*—Jason Olson
(74) *Attorney, Agent, or Firm*—Eric D. Levinson (57) ABSTRACT

The invention provides techniques for adjusting for actuator non-linearities in a data storage system. The invention is particularly useful for piezoelectric actuators, such as actuators that implement a bimorph piezoelectric crystal structure or a laminate piezoelectric crystal structure, although other actuators may present similar non-linearity issues. In one embodiment, the invention provides a method comprising applying a signal to an actuator of a data storage system, the actuator having a non-linear response, wherein the signal includes a linear drive component and a non-linear adjustment component, and positioning a data storage head with respect to a data storage medium via the actuator.

20 Claims, 8 Drawing Sheets

TECHNIQUES FOR ADJUSTING FOR ACTUATOR NON-LINEARITIES IN A DATA STORAGE SYSTEM

TECHNICAL FIELD

The invention relates to data storage media such as magnetic tape and, more particularly, to actuators for positioning heads with respect to data storage media.

BACKGROUND

Data storage media are commonly used for storage and retrieval of data, and come in many forms, such as magnetic tape, magnetic disks, optical tape, optical disks, holographic disks or cards, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium may be organized along "data tracks," and transducer heads can be positioned relative to the data tracks to write data to the tracks or read data from the tracks. A typical magnetic storage medium, such as magnetic tape, may include several data tracks in a data band. Optical media, holographic media, and other media formats can also make use of data tracks. Linear data storage media refers to data storage media, such as magnetic tape or other data storage tape formats, in which data is stored in parallel tracks that extend linearly along the length of the media.

Servo patterns refer to signals or other recorded marks on the medium that are used for tracking purposes. In other words, servo patterns are recorded on the medium to provide reference points relative to the data tracks. A controller interprets detected servo patterns and generates position error signals. The position error signals are used as feedback to adjust the lateral distance of read or write heads relative to the data tracks so that the heads are properly positioned along the data tracks for effective reading and/or writing of the data to the data tracks. Time-based servo patterns and amplitude based servo patterns are common in magnetic tape.

Actuators refer to the elements that mechanically position a head with respect to a data storage medium. For high density media, actuators may be responsive to position error signals, which are generated based on the readout of servo patterns recorded on the media surface. In some cases, a coarse positioning actuator can be used to position a head in general proximity to a desired location, and a fine positioning actuator can be used to precisely position the head in the desired location. The coarse positioning actuator may define a larger range of motion than the fine positioning actuator, but the fine positioning actuator has better positioning accuracy.

SUMMARY

In general, the invention provides techniques for adjusting for actuator non-linearities in a data storage system. The invention is particularly useful for piezoelectric actuators, such as actuators that implement bimorph piezoelectric crystal elements or laminate piezoelectric crystal elements, although other actuators may present similar non-linearity issues. Non-linearities refer to phenomena related to the response of the actuator, in which the actuator response is not linearly related to input signals.

For example, piezoelectric crystal actuators can exhibit non-linearity because of hysteresis. Hysteresis is generally a phenomenon of piezoelectric motion, in which a change in input voltage to the piezoelectric crystal element does not linearly equate to desired expansion or contraction of the piezoelectric crystal element. In particular, hysteresis can be viewed as a form of "memory" in the piezoelectric crystal element, or a non-linear response of the piezoelectric crystal element. When hysteresis is present, the motion induced by an input voltage change is partially dependent on the current state of the piezoelectric crystal element.

In order to address this hysteresis in the piezoelectric crystal element, the invention applies input signals to the piezoelectric crystal actuator that include both a linear drive component and a non-linear adjustment component. The linear drive component of the signal substantially defines actuator response in the absence of the hysteresis, and the non-linear adjustment component defines an additional adjustment that accounts for the hysteresis. A controller for the actuator may include a lookup table that is used to identify the input signal based on the current position of the actuator and a current position error signal (PES). Alternatively, the lookup table may be used to identify the non-linear adjustment component, which can be combined with the linear component to define the input signal to the actuator.

In one embodiment, the invention provides a method comprising applying a signal to an actuator of a data storage system, the actuator having a non-linear response, wherein the signal includes a linear drive component and a non-linear adjustment component; and positioning a data storage head with respect to a data storage medium via the actuator.

In another embodiment, the invention provides a method comprising identifying a position of a magnetic head with respect to a magnetic tape by detecting a servo pattern on the magnetic tape; generating a position error signal (PES) based on the identified position of the magnetic head; performing a lookup based on the identified position and the PES to account for a non-linear response of an actuator; and applying a signal to the actuator to adjust the position of the magnetic head, the signal being defined, at least in part, on the lookup to account for the non-linear response of the actuator.

In another embodiment, the invention provides an apparatus comprising a magnetic head; an actuator coupled to the magnetic head to control positioning of the magnetic head with respect to a magnetic tape, the actuator having a non-linear response due to hysteresis; and a controller to provide an input signal to the actuator, the input signal including a linear drive component and a non-linear adjustment component, wherein the linear drive component of the input signal substantially defines actuator response in the absence of the hysteresis, and the non-linear adjustment component defines an adjustment for the hysteresis to reduce phase lag.

The various embodiments of the invention may be capable of providing one or more advantages. Specifically, piezoelectric crystal actuators can provide improvements over conventional actuators because of their relatively small size, small mass, high force generation and long life. Piezoelectric crystal actuators are particularly attractive for use as fine positioning actuators of heads in a magnetic tape system that also includes a conventional "coarse" actuator.

Moreover, by adjusting for non-linearities of a piezoelectric crystal actuator or other actuator that includes such non-linearities, the invention can significantly reduce phase lag. Phase lag refers to the delay of the closed loop servo response associated with the adjustment of the head position in a data storage system. Hysteresis can significantly increase the phase lag, which is undesirable. When phase lag increases, the time it takes to properly position the head with respect to the data storage medium likewise increases. As phase lag is reduced, the servo loop converges more quickly. Therefore, by adjusting for non-linearities of a piezoelectric crystal actuator, the invention can significantly reduce phase lag and thereby improve the closed loop servo response.

Although non-linearities due to hysteresis are the primary focus of the description below, the invention may also be used to address other non-linearities associated with piezoelectric crystal actuators, or other actuators that exhibit non-linearities. The details of various embodiments of the invention are set forth in the accompanying drawings and the description below. Other features, objects, and advantages of the invention will be apparent from the description and drawings, and from the claims.

DETAILED DESCRIPTION

The invention provides techniques for adjusting for actuator non-linearities in a data storage system. Non-linearities refer to phenomena related to the response of the actuator, in which the actuator response is not linearly related to input signals. The invention is particularly useful for piezoelectric actuators, such as actuators that implement bimorph piezoelectric crystal elements or laminate piezoelectric crystal elements. However, many other types of actuators may present similar non-linearity issues.

Piezoelectric crystal actuators can exhibit non-linearity because of hysteresis. Hysteresis is generally a phenomenon of piezoelectric motion, in which a change in input voltage to the piezoelectric crystal element does not linearly equate to desired expansion or contraction of the piezoelectric crystal element. In particular, hysteresis can be viewed as a form of "memory" in the piezoelectric crystal element, or a non-linear response of the piezoelectric crystal element. When hysteresis is present, the motion induced by an input voltage change is partially dependent on the current state of the piezoelectric crystal element.

More specifically, hysteresis is related to the crystalline polarization and molecular effects within a piezoelectric crystal. Whenever a voltage is applied across a piezoelectric crystal, remnant polarization occurs as the domains of the crystalline structure align to the electric field. If the applied voltage is reversed, then the remnant polarization is first overcome, before the piezoelectric crystal will react in the reverse direction. Therefore, the amount of hysteresis is typically dependent on the previously applied electrical field strength and direction, which define the current state of the piezoelectric crystal element.

In order to address this hysteresis in the piezoelectric crystal element, the invention applies input signals to the piezoelectric crystal actuator that include both a linear drive component and a non-linear adjustment component. The linear drive component of the signal substantially defines actuator response in the absence of the hysteresis, and the non-linear adjustment component defines an additional adjustment to account for the hysteresis.

As described in greater detail below, a controller for the actuator may include a lookup table that is used to identify the input signal based on the current position of the actuator and a current position error signal (PES). Alternatively, the lookup table may be used to identify the non-linear adjustment component, which can be combined with the linear component to define the input signal to the actuator. In either case, the lookup table can be programmed to account for the hysteresis as a function of head position and position error.

Figure 1:
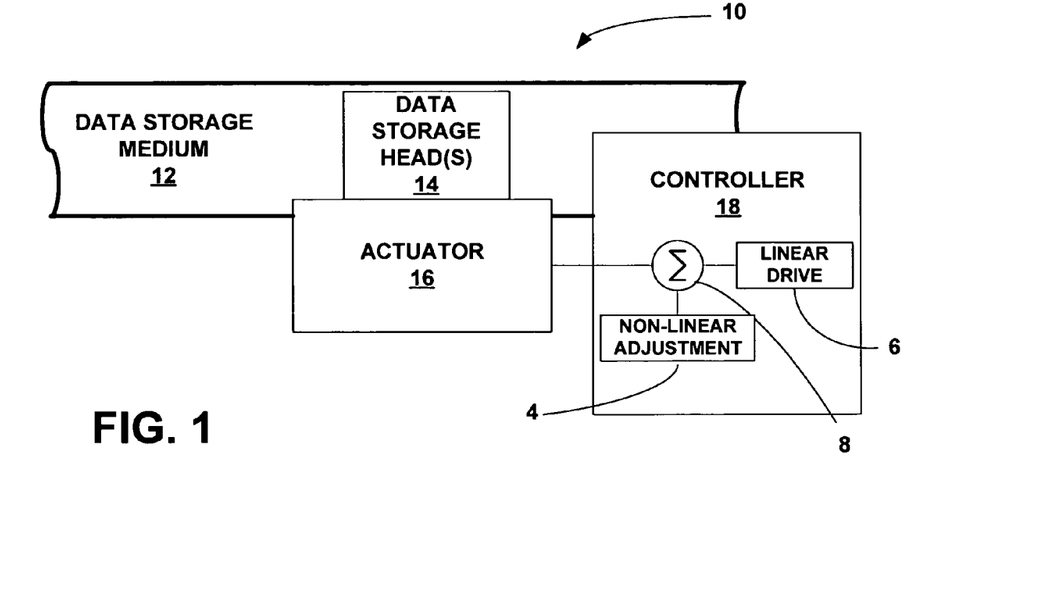
FIGS. 1-3 are block diagrams of data storage systems according to embodiments of the invention.

FIG. 1 is a block diagram of a data storage system 10 according to an embodiment of the invention. As shown, an actuator 16 controls lateral positioning of one or more data storage heads 14 with respect to data storage medium 12. Controller 18 applies input signals to actuator 16 to cause actuator 16 to position heads 14 with respect to medium 12. Importantly, the applied signals to actuator include a linear drive component 6 and a non-linear adjustment component 4. For purposes of illustration in FIG. 1, a summation unit 8 is shown, which could be used to combine the different components. However, in many embodiments summation unit 8 is not needed to implement the invention.

In some embodiments, a lookup table is used to generate the non-linear adjustment component 4 based on the current position of heads 14 and position error signals generated by controller. In this case, the position error signals may be used to define the linear drive component 6, which is combined with the non-linear adjustment component 4. In other embodiments, however, a lookup table can be used to select the input signal directly based on the current position of heads 14 and position error signals generated by controller 18. In that case, the input signals would still include linear drive component 6 and non-linear adjustment component 4, but the need for a summation of these components would be eliminated because the input signal would be the direct output of the lookup table. In other words, in accordance with the invention, it is important that the input signals to actuator include a linear drive component 6 and a non-linear adjustment component 4, but summation of these components is optional since a lookup could be used to define the summed input signals directly, without the need for another summation.

Data storage medium 12 may comprise any of a wide variety of media useful for information storage and retrieval. Examples of data storage medium 12 include linear media such as magnetic tape, magneto optic tape, holographic tape, or other tape formats. Other examples may include a magnetic disk, an optical disk, a magneto-optic disk, holographic disks or cards, or any other data storage media format. In the following description, many aspects of the invention are described in the context of a data storage medium 12 that comprises magnetic tape. The invention, however, may find application in many other data storage media systems that make use of a head that is positioned by an actuator. In such cases, the head generally refers to any element used to read data from a medium or write data to the medium.

The format of heads 14 may be dictated by the format of medium 12. For magnetic tape, heads 14 may include any of a wide variety of heads that have been developed for read and/or write functionality. In magnetic tape systems, the heads typically contact the tape. Examples of heads 14 for use in a magnetic tape system include magneto-resistive (MR) heads, giant magneto-resistive (gMR) heads, inductive heads, thin film heads, C-core heads that include an excitation coil around the C-core, and a wide variety of other types of heads. Heads 14 may include one or more write heads that can write data, and/or one or more read heads that can read data written by the write heads, e.g., for verification of data as it is written. Some heads can both read and write data, and may be used as either a read element or a write element. Other types of heads are only suited for reading or writing.

Heads 14 may also include one or more servo heads, which are specific types of read heads designed specifically to read servo marks, e.g., of a time-based or amplitude-based servo pattern on the surface of medium 12. In that case, the servo heads may provide input to controller 18 for closed-loop feedback control or the positioning of heads 14.

Actuator 16 exhibits a non-linear response to input signals. Examples of actuator 16 include any type of piezoelectric crystal, although other types of actuators may have similar non-linearity issues. One example of actuator 16 is a laminate piezoelectric crystal stack, which is driven by a voltage through its range of motion. In that case, voltage changes across actuator 16 can cause expansion or contraction of actuator 16 to induce desired lateral motion of heads 14 to position heads 14 with respect to medium 12. Another example of actuator 16 is a "bi-morph" piezoelectric crystal structure, which comprises flat piezoelectric crystals that are glued together. A bi-morph piezoelectric crystal structure bends in response to voltage changes applied across the crystals because the different layers expand or contract at different rates in response to voltage changes.

Controller 18 provides input signals to actuator 16 to cause actuator 16 to position heads 14 with respect to medium 12. Again, the input signals to actuator include a linear drive component 6 and a non-linear adjustment component 4. The linear drive component 6 of the signal may substantially define actuator response in the absence of the hysteresis, and the non-linear adjustment component 4 can define an adjustment specifically for the hysteresis. A lookup table may be implemented to define non-linear adjustment component 4, which is then added to linear drive component 6 by summation unit 8. Again, however, the lookup table may alternatively be implemented to select the input signal directly, in which case, the need for summation unit 8 would be eliminated.

In any case, the introduction of non-linear adjustment component 4 can adjust for non-linearities in actuator 16. Moreover, by adjusting for such non-linearities, the invention can significantly reduce phase lag in system 10. Phase lag refers to the delay of the closed loop servo response associated with the adjustment of position of heads 14 with respect to medium 12. Hysteresis can significantly increase the phase lag, which is undesirable. When phase lag increases, the time it takes to properly position the head with respect to the data storage medium likewise increases. As phase lag is reduced, the servo loop converges more quickly. Therefore, by adjusting for non-linearities via the introduction of non-linear adjustment component 4, the invention can significantly reduce phase lag and thereby improve the closed loop servo response of actuator 16.

Figure 2:
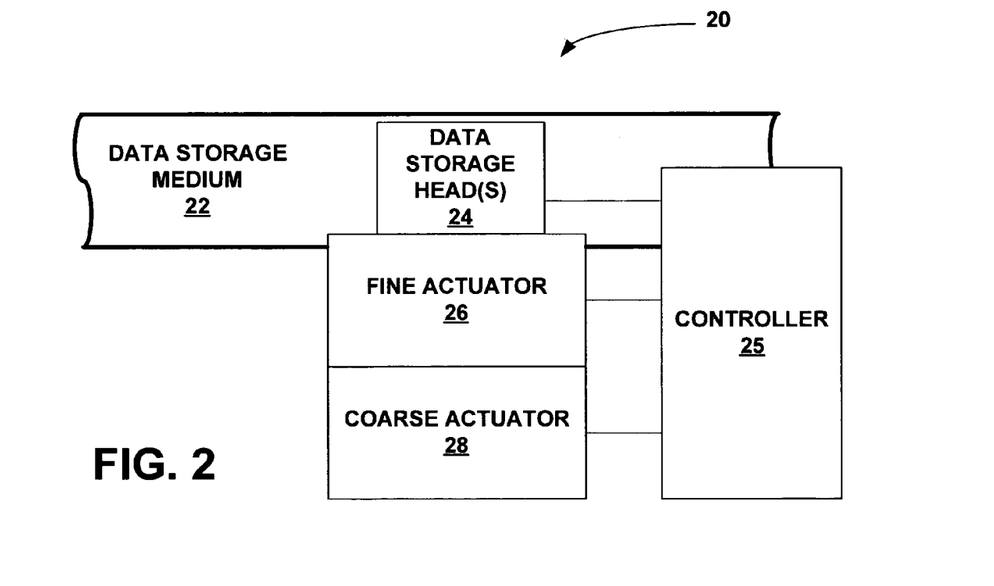

FIG. 2 is another block diagram of a data storage system 20 according to an embodiment of the invention. In this embodiment, system 20 includes two actuators, a coarse actuator 28 and a fine actuator 26. Fine actuator 26 may comprise a piezoelectric crystal element as described herein, or another actuator that exhibits a non-linear response to input signals. Fine actuator 26 may receive input signals from controller 25 that include non-linear adjustment component to compensate for hysteresis. In any case, both coarse actuator 28 and fine actuator 26 control lateral positioning of one or more data storage heads 24 with respect to data storage medium 22. Controller 25 provides input signals to both coarse actuator 28 and fine actuator 26 to cause the desired motion in actuators 26, 28 and thereby position heads 24 with respect to medium 22.

Coarse actuator 28 may define a larger range of motion than the fine actuator 26, but fine actuator 26 has better positioning accuracy. As mentioned, fine actuator 26 comprises a piezoelectric crystal element as described herein, or another actuator that exhibits a non-linear response to input signals. Coarse actuator 28 may comprise any of a wide variety of conventional actuators, such as a stepper motor, a voice coil, a ball screw actuator, a wiggle-worm actuator, or another type of actuator.

Figure 3:
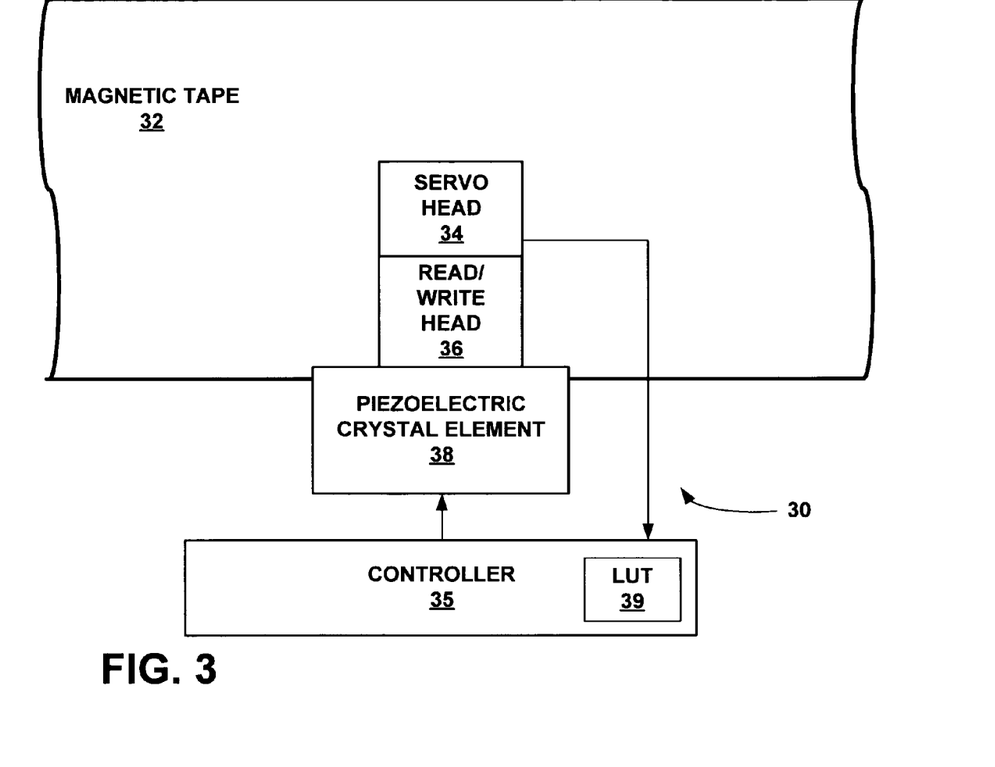

FIG. 3 is another block diagram of a data storage system 30 according to an embodiment of the invention. In this embodiment, system 30 is specifically illustrated as including a servo head 34 and a read/write head 36. Piezoelectric actuator 38 comprises a piezoelectric crystal element that positions heads 34 and 36 with respect to data storage medium 32. Piezoelectric actuator 38 may receive input signals from controller 35 that include a linear drive component to substantially defines actuator response in the absence of the hysteresis, and the non-linear adjustment component to define an adjustment for the hysteresis, in order to reduce phase lag.

Servo head 34 detects recorded servo patterns from data storage medium 32 in order to provide feedback to controller 35. Controller 35 generates and deciphers position error signals, which are generated based on the detected servo patterns, and adjusts the lateral positioning of heads 34 and 36 by driving piezoelectric actuator 38. In other words, controller 35, piezoelectric actuator 38, and servo head 34 form a closed-loop positioning system that converges read/write head 36 to the proper track of data storage medium 32. Controller 35 includes a lookup table (LUT) 39 programmed to account for the hysteresis as a function of head position and position error. LUT 39 may be used to select the non-linear adjustment component which is added to a linear drive component, or may be used to directly select the input signal that includes both linear drive component and the non-linear adjustment component. Again, the use of a non-linear adjustment component in the input signal can significantly reduce phase lag in the closed loop positioning system that converges read/write head 36 to the proper track of data storage medium 32.

Figure 4:
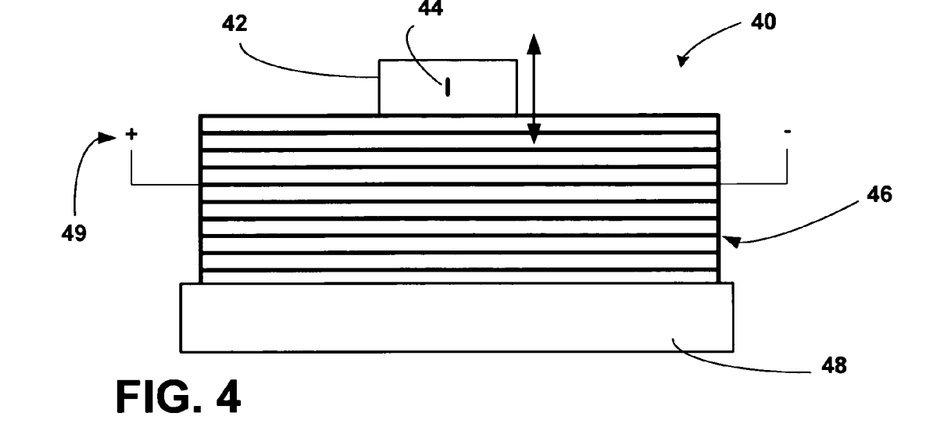
FIG. 4 is a conceptual side view of an exemplary piezoelectric crystal laminate actuator.

FIG. 4 is a conceptual side view of an exemplary piezoelectric crystal actuator 40. Piezoelectric crystal actuator 40 comprises a laminate piezoelectric crystal structure 46 (also referred to as a piezoelectric laminate stack) that includes a plurality of piezoelectric layers. Laminate piezoelectric crystal structure 46 may be formed over a substrate 48. When a voltage 49 is applied across laminate piezoelectric crystal structure 46, the laminate piezoelectric crystal structure 46 expands or contracts. A magnetic head 42 that defines a magnetic gap 44 for magnetic recording or readout is positioned on laminate piezoelectric crystal structure 46. Therefore, expansion or contraction of laminate piezoelectric crystal structure 46 can cause lateral motion of magnetic head 42 to thereby position magnetic gap 44 with respect to a data track of a magnetic medium.

By way of example, laminate piezoelectric crystal structure 46 may define a thickness on the order of approximately 2.5 centimeters. In that case, laminate piezoelectric crystal structure 46 may define a range of motion on the order of approximately 15 microns. Laminate piezoelectric crystal structure 46 may respond to input much faster than conventional voice coil actuators. In addition, relative to conventional actuators, piezoelectric crystal actuator 40 may define a relatively small size, small mass, high force generation and long useful life.

Figure 5:
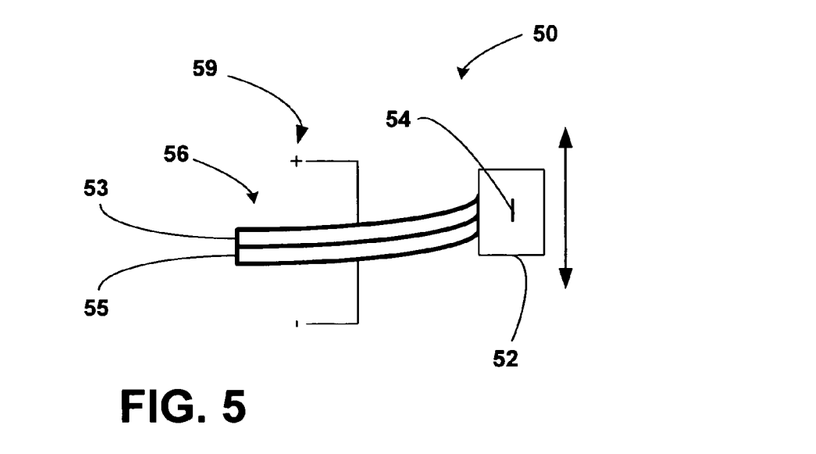
FIG. 5 is a conceptual side view of an exemplary piezoelectric crystal bimorph actuator.

FIG. 5 is a conceptual side view of an exemplary piezoelectric crystal actuator 50. Piezoelectric crystal actuator 50 comprises a bimorph piezoelectric crystal structure 56 that includes a piezoelectric layer 53 bonded to a second piezoelectric layer 55. When a voltage 59 is applied across bimorph piezoelectric crystal structure 56, the layers 53, 55 of bimorph piezoelectric crystal structure 56 expand or contract at different rates. This differential expansion/contraction of layers 53, 55 cause bimorph piezoelectric crystal structure 56 to bend. A magnetic head 52 that defines a magnetic gap 54 for magnetic recording or readout, is positioned on bimorph piezoelectric crystal structure 56. Therefore, the differential expansion/contraction of layers 53, 55 of bimorph piezoelectric crystal structure 56 can cause lateral motion of magnetic head 52 to thereby position magnetic gap 54 with respect to a data track of a magnetic medium. By way of example, the typical range of motion for a bimorph piezoelectric crystal having a length of approximately 10 millimeters is ±20 microns.

As described herein, in order to address hysteresis in piezoelectric crystal actuators 40 and 50, the input signal to each actuator (in this case voltages 49 and 59) can include a non-linear adjustment component specifically related to hysteresis. At the time of fabrication, the non-linear adjustment components of the input signal, which are stored in a lookup table for each actuator 40, 50, can be pre-computed for different starting positions of heads 42, 52 and different adjustments that may be needed to reposition gaps 44, 54 with respect to tracks of magnetic tape. The pre-computed non-linear adjustments may be defined for a number of similarly fabricated actuators based on testing or statistical modeling of similar actuators, or may be defined for each individual actuator that is fabricated based on experimental testing of each actuator. In some cases, to handle manufacturing variation from one actuator to the next, a weighting factor may be added to account for hysteresis likely to be present in every produced actuator. The weighting factor may provide a conservative estimate for addressing hysteresis. A lookup table may be created for the actuators at the time of fabrication to account for hysteresis. The lookup table can be incremented in units of microns, or by any factor over the full range of the actuator. Based on collected data, a 1 µm unit proved useful over an operating range of ±15 µm. In this case, the length of the lookup table may be 30 elements. Also, to account for bandwidth, a secondary weighting factor may also be used.

Figure 6:
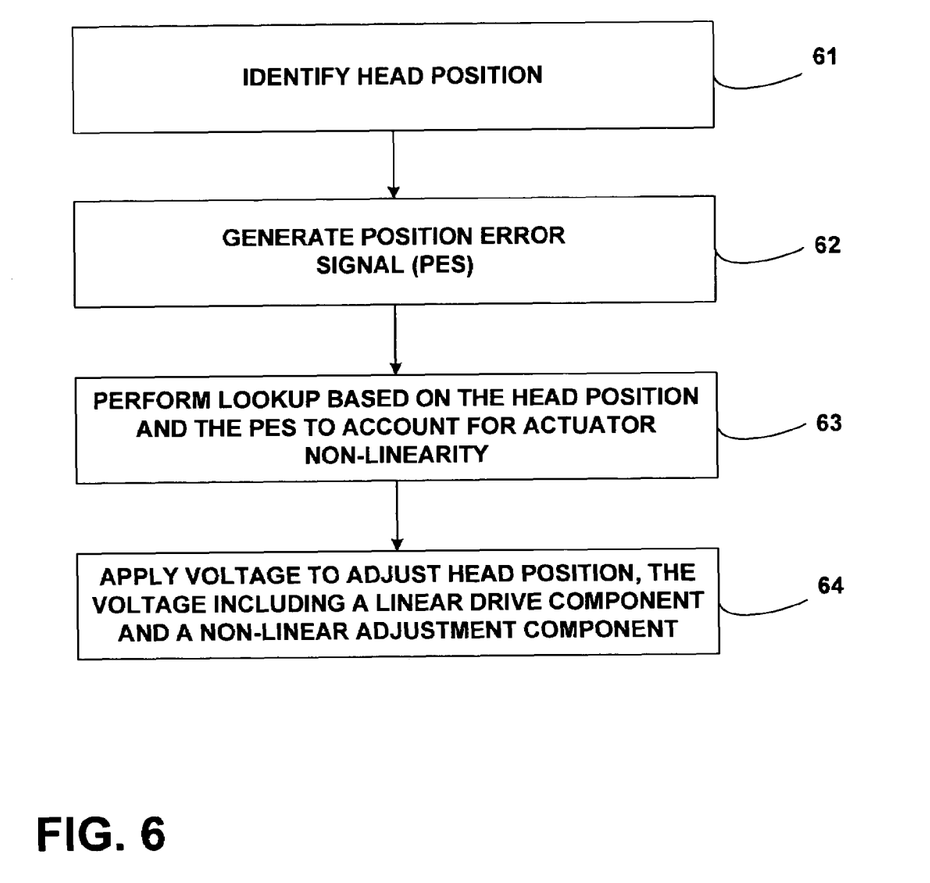
FIG. 6 is a flow diagram illustrating a technique according to an embodiment of the invention.

FIG. 6 is a flow diagram illustrating a technique according to an embodiment of the invention. FIG. 6 will be described with reference to system 30 of FIG. 3. As shown in FIG. 6, controller 35 identifies the position of read/write head 36 based servo signals detected by servo head 34 (61). Controller 35 also generates a position error signal based on the servo signals (62).

In order to account for actuator non-linearity in piezoelectric actuator 38, controller 35 accesses lookup table 39. In particular, controller 35 performs a lookup based on head position and the position error signal to account for such non-linearity in piezoelectric actuator 38 (63). Lookup table 39 can be programmed to identify an input signal that accounts for hysteresis adjustment as a function of head position and position error. In that case, controller 35 identifies the head position and generates a position error signal (PES) indicative of position error, and selects an entry from the lookup table 39 based on the head position and the PES to define the input signal.

Alternatively, lookup table 39 can be programmed to identify a hysteresis adjustment as a function of head position and position error. In that case, controller 35 selects an entry from the lookup table 39 based on the head position and the PES to define the adjustment portion of the input signal, and then combines the adjustment portion with the drive portion of the input signal. The linear drive component of the input signal may be defined by the PES, or by the current head position and a needed actuator response in the absence of the hysteresis. In either case, controller 35 applies a voltage to piezoelectric actuator 38 to adjust the position of heads 34 and 36 (64). Importantly, the voltage includes both the linear drive component and the non-linear adjustment component. The linear drive component substantially defines the needed actuator response in the absence of the hysteresis, and the non-linear adjustment component that defines an adjustment for the hysteresis to reduce phase lag.

Figure 7:
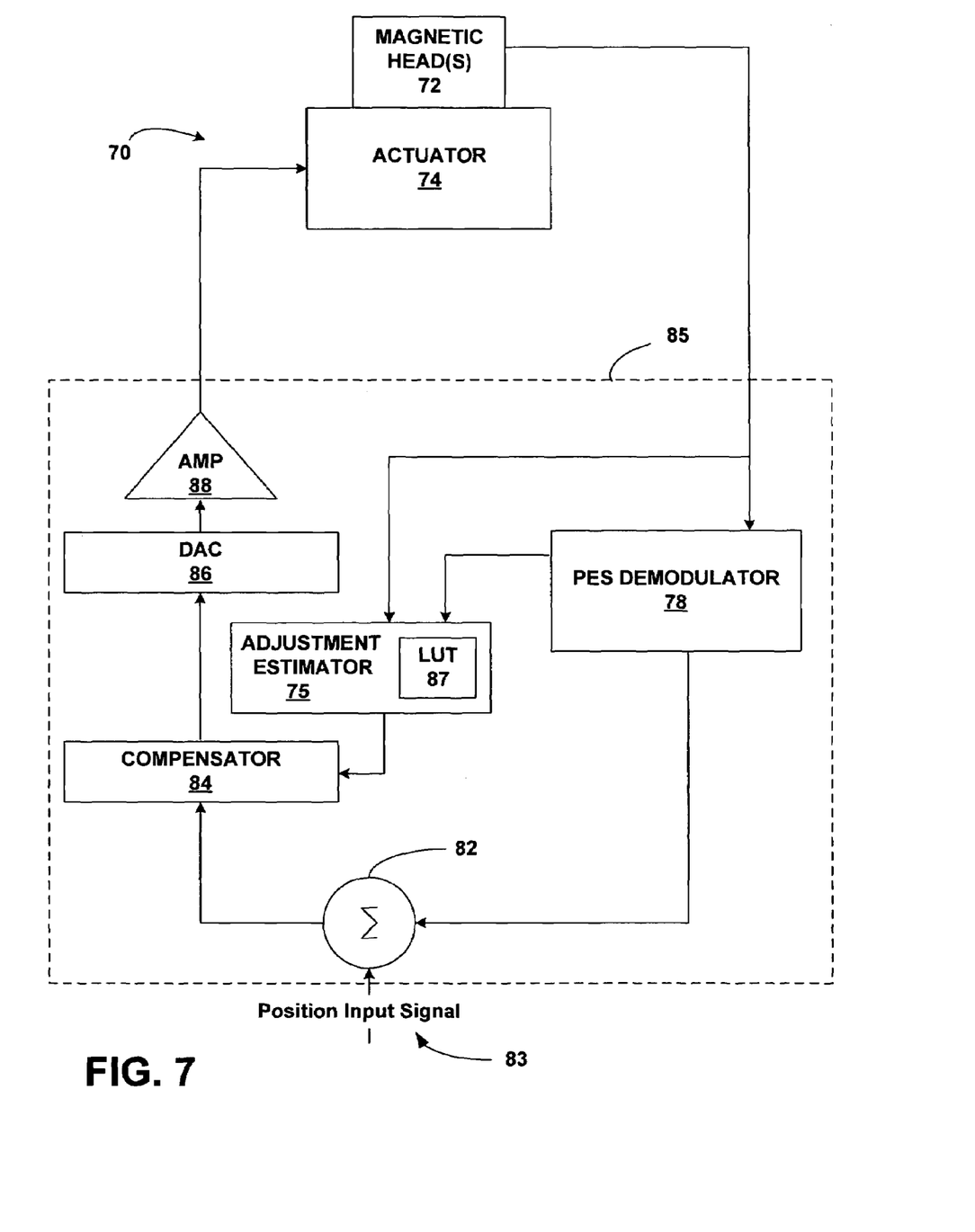
FIG. 7 is a block diagram of an embodiment of an apparatus that can be used to position magnetic heads with respect to magnetic tape.

FIG. 7 is a more detailed block diagram of one embodiment of an apparatus 70 that can be used to position magnetic heads 72 with respect to magnetic tape (not shown in FIG. 7). System 70 includes an actuator 74, which may comprise a piezoelectric crystal element as described herein, or any other type of actuator that exhibits a non-linear response to input signals. Actuator 74 receives input signals from controller 85 that include a linear drive component that substantially defines a linear response for actuator 74, and a non-linear adjustment component that defines an adjustment to account for the non-linearity of the real response of actuator 74.

Magnetic heads 72 include one or more servo heads and one or more read or write heads. The servo heads provide input to controller 85 used to facilitate closed loop servo-positioning. Controller 85 receives position input signal 83 and causes movement of actuator 74 to position magnetic heads 72. Any residual error in the position of heads 72 is then adjusted in the servo loop of controller 85, i.e., as the loop converges.

Specifically, position error signal (PES) demodulator 78 receives signals detected by servo head elements of heads 72. PES demodulator 78 demodulates a detected servo signal to generate a position error signal. The position signals detected by the servo head elements of heads 72, as well as the position error signal generated by PES demodulator are provided to adjustment estimator 75. Adjustment estimator 75 includes a lookup table (LUT) 87 programmed to identify a non-linear adjustment needed to compensate for non-linearity, e.g., hysteresis, in the response of actuator 74.

Summation unit 82 sums the position error signal with position input signal 83 in order to compensate for any detected misalignment of the servo head with respect to a servo pattern. Position input signal 83 may comprise the initial input to controller 85 defining the desired position of magnetic heads 72.

Compensator 84 receives the output of summation unit 82, as well as an adjustment estimated by adjustment estimator 75, and generates a compensation signal indicative of an adjustment to be made by actuator 74. DAC 86 comprises a digital-to-analog converter to generate a voltage signal based on the output of compensator 84. Amplifier 88 amplifies the output of DAC 86 to generate a drive signal that will cause movement of actuator 74.

The drive signal from amplifier 88 may comprise a suitable voltage to cause such movement of actuator 74. In order to reduce phase lag caused by hysteresis or other non-linearity affects, the applied voltage includes not only a drive component (relating to a linear response), but also an adjustment component to account for the non-linearity. In this manner, the closed loop servo response can be improved.

Figure 8:
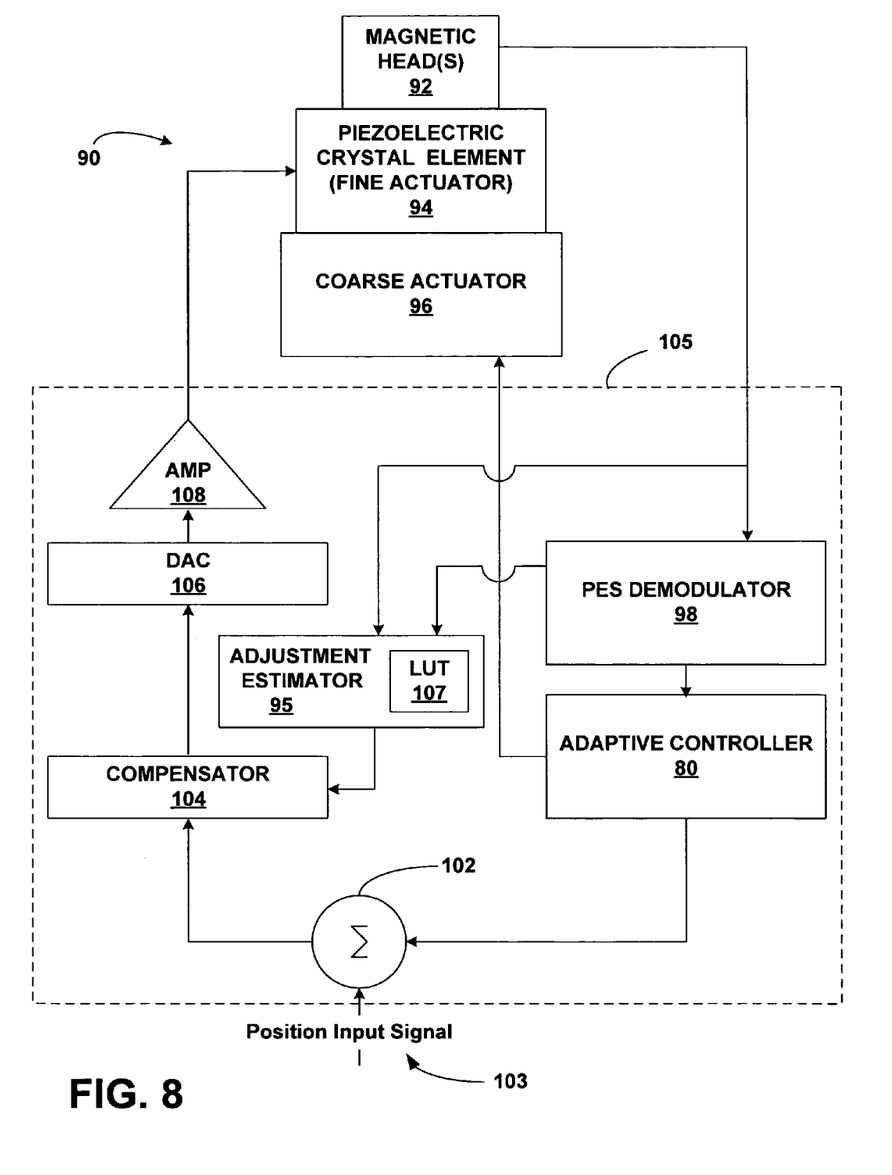
FIG. 8 is another block diagram of an embodiment of an apparatus that includes a coarse positioning actuator and a fine positioning actuator.

FIG. 8 is block diagram of another embodiment of an apparatus 90 that can be used to position magnetic heads 92 with respect to magnetic tape (not shown in FIG. 8). System 90 includes two actuators, a coarse actuator 96 and a fine actuator 94. Fine actuator 94 comprises a piezoelectric crystal element as described herein, and may receive input signals from controller 105 that include linear drive component and a non-linear adjustment component. In any case, both coarse actuator 96 and fine actuator 94 control lateral positioning of heads 92 with respect to a data storage medium (not shown). Coarse actuator 96 may define a larger range of motion than the fine actuator 94, but fine actuator 94 has greater positioning accuracy.

Magnetic heads 92 include one or more servo heads and one or more read or write heads. The servo heads provide input to controller 105 used to facilitate closed loop servo-positioning. Controller 105 receives position input signal 103 and causes movement of fine actuator 94 to position magnetic heads 92. Any residual error in the position of heads 92 is then adjusted in the servo loop of controller 105.

Specifically, PES demodulator 98 receives signals detected by servo head elements of heads 92. PES demodulator 98 demodulates a detected servo signals to generate a position error signal. Adaptive controller 80 examines the position error signal and performs any adjustments to coarse actuator 96, if necessary. The position signals detected by the servo head elements of heads 92, as well as the position error signal generated by PES demodulator are provided to adjustment estimator 95. Adjustment estimator 95 includes a lookup table (LUT) 107 programmed to identify a non-linear adjustment needed to compensate for non-linearity, e.g., hysteresis, in the response of actuator 94.

Summation unit 102 sums the position error signal with position input signal 103 in order to compensate for any detected misalignment of the servo head with respect to a servo pattern. Position input signal 103 may comprise the initial input to controller 105 defining the desired position of magnetic heads 92.

Compensator 104 receives the output of summation unit 102, as well as an adjustment estimated by adjustment estimator 95, and generates a compensation signal indicative of an adjustment to be made by actuator 94. DAC 106 comprises a digital-to-analog converter to generate a voltage signal based on the output of compensator 104. Amplifier 108 amplifies the output of DAC 106 to generate a drive signal that will cause movement of actuator 94.

The drive signal from amplifier 108 may comprise a suitable voltage to cause such movement of actuator 94. In order to reduce phase lag caused by hysteresis or other non-linearity affects, the applied voltage includes not only a linear drive component (relating to a linear response), but also an adjustment component to account for the non-linearity. In this manner, the closed loop servo response can be improved.

In general, the adjustment estimator 75 or 95 (FIG. 7 or 8) can use the PES to determine the direction of the actuator or to determine when a pending direction change is going to occur. A lookup table can be used, as described herein to account for non-linearities in the actuator, or the non-linear adjustments can be calculated on the fly.

Figure 9:
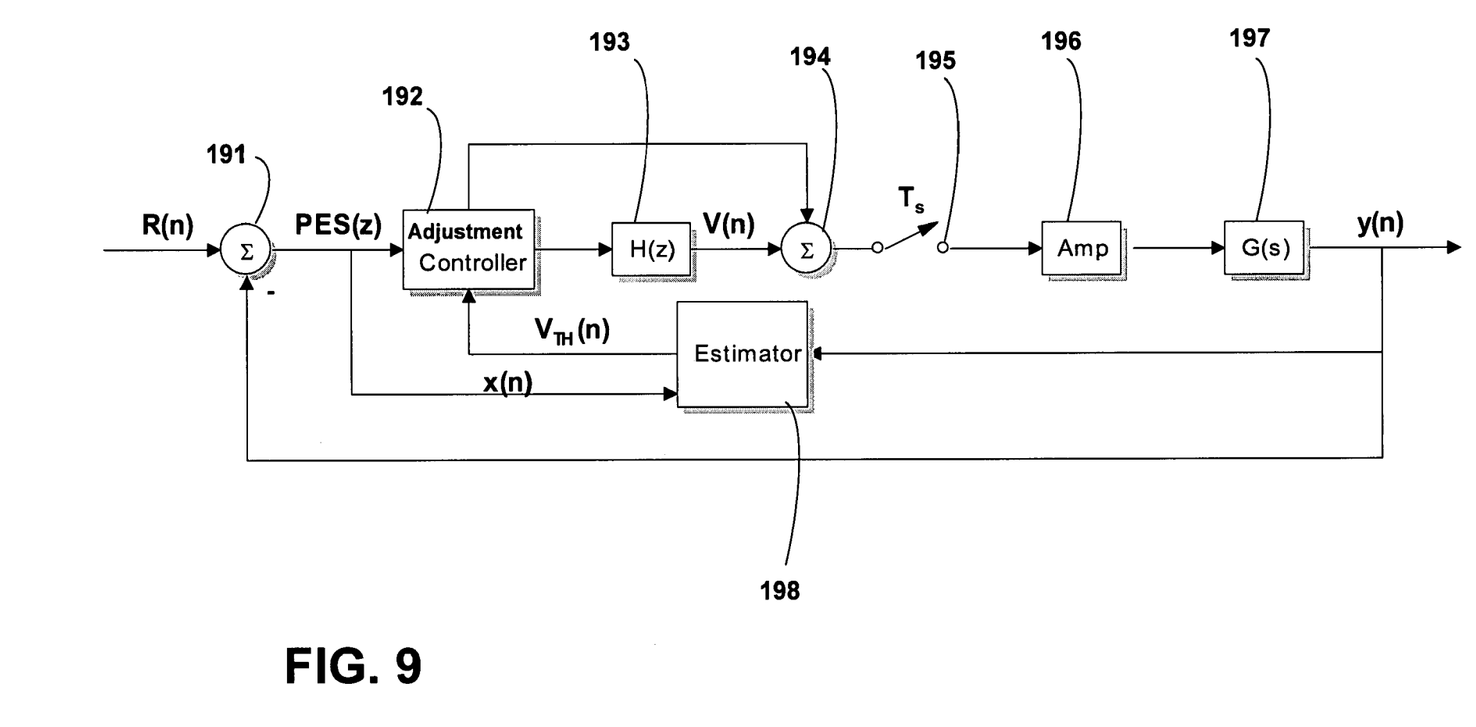
FIG. 9 is yet another block diagram of an apparatus according to an embodiment of the invention.

FIG. 9 is another block diagram depicting an embodiment of the invention. In this depiction, the value R(n) is the input value identifying the desired head position and y(n) is the measured output position. G(s) 197 represents both the actuator and head that is moved by the actuator. PES(z) refers to the position error signal, which may be determined by subtracting y(n) from R(n) via summation unit 191.

Adjustment controller 192, H(z) 193 and summation unit 194 may comprise a compensator unit that defines output signals to adjust for both linear and non-linear hysteresis of the actuator. Estimator 198 may perform a table lookup to define the non-linear adjustment component of the input signal to the actuator based on the position y(n) and signal x(n) indicative of PES(z). Adjustment controller 192 may determine whether or not to implement the non-linear adjustment component. If so, the non-linear adjustment component can be fed to summation unit 194 and combined with linear drive component V(n). $T_S$ 195 may represent a switch that performs digital to analog conversion of the signal from summation unit 194. Amplifier 196 may amplify the signal as necessary to drive the actuator.

Figure 10:
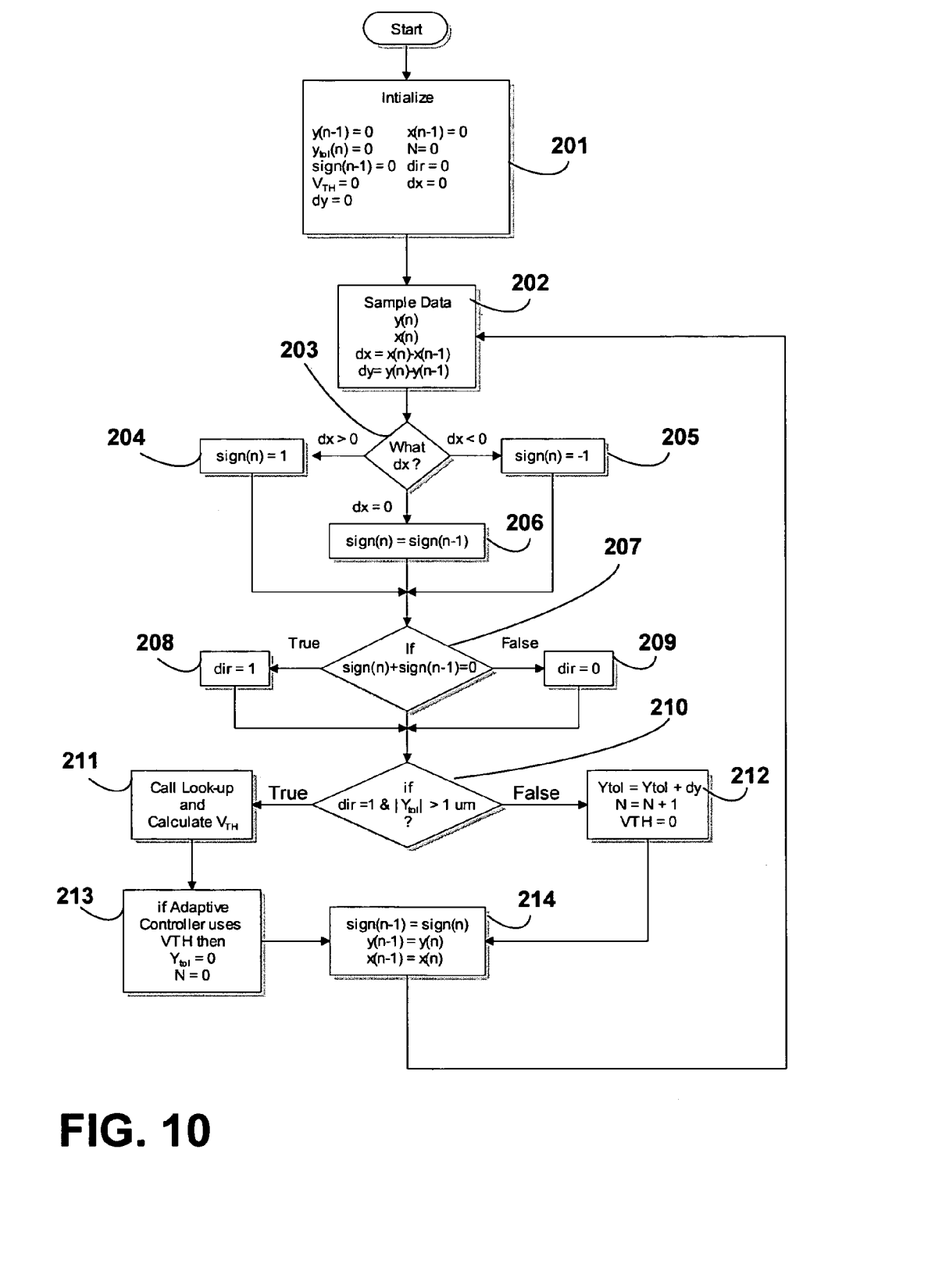
FIG. 10 is a flow diagram illustrating a technique that can be implemented by the apparatus of FIG. 9.

FIG. 10 is a flow diagram illustrating a technique that may be implemented by the system of FIG. 9. More specifically, adjustment controller 192 and estimator 198 may implement the technique of FIG. 10 to cause non-linear adjustments to the actuator to address hysteresis. Estimator 198 initializes variables as illustrated at (201). y(n−1) refers to the previously sampled position of the actuator and is initialized to zero. $y_{tot}(n)$ refers to the total displacement of the actuator in one direction and is initialized to zero. Sign (n−1) refers to the previous sampled direction of the actuator and is initialized to zero. $V_{TH}$ refers to a command input voltage to the actuator referenced to the non-linearity lookup table and is initialized to zero. The variable dy refers to the derivative of the actuator position and is initialized to zero. The variable x(n−1) refers to the previously sampled position error signal (PES) and is initialized to zero. The variable N refers to the total number of samples measured in one direction of motion of the actuator (used to estimate frequency range of hysteresis based on sampling frequency) and is initialized to zero. The variable dir refers to a direction flag indicating a change in direction of the actuator and is initialized to zero. The variable dx refers to the derivative of the error signal and is initialized to zero.

As estimator 198 revives and samples data as indicated at (202), y(n) refers to the position of the actuator, x(n) refers to the position error signal (PES), dx becomes x(n)−x(n−1), and dy becomes y(n)−y(n−1). Estimator 198 then determines the value of dx (203). If dx is greater than zero, sign(n) becomes 1 (204). If dx is less than zero, sign(n) becomes 0 (205). If dx is zero, sign(n) becomes sign(n−1)

(206). Estimator then examines the value of sign(n) relative to sign(n−1) (207). If sign(n)+sign(n−1) is zero, the direction value dir is set to 1 (208). If sign(n)+sign(n−1) is not zero, the direction value dir is set to 0 (209). Estimator 198 then examines the values of dir and $Y_{tol}$ (210). $Y_{tol}$ refers to the total accumulated displacement of the actuator as it moves in one direction (accumulated at each sample). If dir is 1 and $Y_{tol}$ is greater than a threshold, in this case 1 micron (true branch of 210), estimator 198 calls a lookup to calculate $V_{TH}$ which defines a non-linear adjustment component for the actuator (211). If dir is not 1 or $Y_{tol}$ is not greater than the threshold (false branch of 210), estimator 198 sets $Y_{tol}$ as $Y_{tol}$+dy, sets N as N+1 and sets $V_{TH}$ as zero (212).

In some cases, even if $V_{TH}$ is defined as non-zero, adjustment controller 192 may choose to ignore $V_{TH}$, e.g., if the movement of the actuator is too small to invoke substantial hysteresis. Thus, adjustment controller 192 may determine whether to use $V_{TH}$. If adjustment controller 192 uses $V_{TH}$ by forwarding this value to summation unit 194, $Y_{tol}$ can be reset to zero and N can be reset to zero (213). Sign (n−1) is then set to sign (n), y(n−1) is set to y(n) and x(n−1) is set to x(n) (214), and the process returns to (202) for the next servo control loop.

Generally, the total displacement can be determined by accumulating the absolute position y(n) received in the feedback loop between direction changes. The total displacement may be defined as:

$$dy(n) = y(n) - y(n-1)$$

$$Y_{tol}(k) = \sum_{n=0}^{N} dy(k-n)$$

where dy(n) defines the incremental displacement or rate change of actuator between the present and previous sampled positions, and $Y_{tol}$(k) defines the total accumulated displacement of the actuator as it moves in one direction.

As adjustments in "n" increments converge to some value of N, the final value of N can be used to estimate the frequency band at which the displacement occur over. The frequency band can be calculated as follows:

$$f = \frac{F_s}{N} \text{ where } F_s = SamplingFrequency, \text{ and}$$

f=the frequency band over which the total actuator displacement occurred in one direction.

To determine direction of movement, the slope of the PES can be evaluated as follows:

$x(n)=PES(n)$ $dx(n)=x(n)-x(n-1)$ $dx(n)>0$ then $sign(n)=1$ $dx(n)<0$ then $sign(n)=-1$ $dx(n)=0$ then $sign(n)=sign(n-1)$ where x(n)=the current measured position error of actuator relative to media,
x(n−1) defines the previously sampled position error signal, and
dx(n)=the incremental rate of change of the position error signal, Again, the flow diagram of FIG. 10 illustrates one example of a basic algorithm that could be deployed.

The final predicted value of $V_{TH}$ may also be weighted. As an example, 2 weighted parameters may be used $w_f$ and $w_p$.

$V_f = w_p w_f V_{TH}$, where $w_p$ is the scale factor based on statistical population of actuators;
$w_f$ defines a look-up weight factor based on N (Frequency affect);
$V_{TH}$ is the lookup table value based on $Y_{tol}$; and
$V_f$ is the derived input command voltage from non-linear lookup table with weighted statistical factors to handle overall population of actuators.

Adjustment controller 192 may determine whether a valid PES value is present. If so, the directional change is valid and adjustment controller 192 can feed forward the required incremental gain to summation unit 194 needed to overcome the hysteresis.

A number of embodiments of the invention have been described. For example, a piezoelectric crystal element actuator has been described to mechanically position a head with respect to a data storage medium. Furthermore, in order to address hysteresis in the piezoelectric crystal element (or another actuator that has similar non-linearity), this disclosure has described a lookup table for selecting a non-linear adjustment to the actuator input. Although the invention has been specifically described in the context of a magnetic tape system, it may find application in a wide variety of other data storage systems. Also, although specifically described in the context hysteresis of a piezoelectric actuator, the invention may also be used to address other non-linearities of piezoelectric actuators or other types of actuators. A specific implementation of the invention has also been described with reference to FIGS. 9 and 10. However, many other implementations could also be defined, consistent with this disclosure. These and other embodiments are within the scope of the following claims.

The invention claimed is:

1. A method comprising:
    detecting a servo pattern on a data storage medium;
    generating a position error signal (PES) based on the detection of the servo pattern;
    determining a linear drive component based on the PES to linearly adjust positioning of a data storage head relative to the data storage medium;
    determining a non-linear adjustment component based on a position of the data storage head and the PES to non-linearly adjust positioning of the data storage head relative to the data storage medium;
    applying a signal to an actuator that controls positioning of the data storage head, the actuator having a non-linear response, wherein the signal includes the linear drive component determined based on the PES and a non-linear adjustment component determined based on the position of the data storage head and the PES; and
    positioning the data storage head with respect to the data storage medium via the actuator.

2. The method of claim 1, wherein the actuator comprises a piezoelectric crystal element.

3. The method of claim 2, wherein the piezoelectric crystal element comprises a bimorph piezoelectric crystal structure and the signal comprises a voltage applied across the bimorph piezoelectric crystal structure to cause the bimorph piezoelectric crystal structure to bend and thereby position the data storage head with respect to the data storage medium.

4. The method of claim 1, wherein the piezoelectric crystal element comprises a laminate piezoelectric crystal structure and the signal comprises a voltage applied across the laminate piezoelectric crystal structure to cause the laminate piezoelectric crystal structure to expand or contract and thereby position the data storage head with respect to the data storage medium.

5. The method of claim 1, further comprising:
performing a table lookup to select the signal that includes the linear drive component determined based on the PES and the non-linear adjustment component determined based on the position of the data storage head and the PES.

6. The method of claim 1, further comprising:
performing a table lookup to select the non-linear adjustment component of the signal, the non-linear adjustment component having been determined based on the position of the data storage head and the PES.

7. The method of claim 1, wherein the non-linear response is due to hysteresis of the actuator, wherein the linear drive component of the signal substantially defines actuator response in the absence of the hysteresis, and the non-linear adjustment component defines an adjustment for the hysteresis to reduce phase lag.

8. A method comprising:
identifying a position of a magnetic head with respect to a magnetic tape by detecting a servo pattern on the magnetic tape;
generating a position error signal (PES) based on the identified position of the magnetic head;
performing a table lookup based on the identified position and the PES to account for a non-linear response of an actuator; and
applying a signal to the actuator to adjust the position of the magnetic head, the signal being defined, at least in part, on the lookup to account for the non-linear response of the actuator.

9. The method of claim 8, wherein the actuator comprises a piezoelectric crystal element.

10. The method of claim 9, wherein the piezoelectric crystal element comprises a bimorph piezoelectric crystal structure and the signal comprises a voltage applied across the bimorph piezoelectric crystal structure to cause the bimorph piezoelectric crystal structure to bend and thereby position the magnetic head with respect to the magnetic tape.

11. The method of claim 9, wherein the piezoelectric crystal element comprises a laminate piezoelectric crystal structure and the signal comprises a voltage applied across the laminate piezoelectric crystal structure to cause the laminate piezoelectric crystal structure to expand or contract and thereby position the magnetic head with respect to the magnetic tape.

12. An apparatus comprising:
a magnetic head;
an actuator coupled to the magnetic head to control positioning of the magnetic head with respect to a magnetic tape, the actuator having a non-linear response due to hysteresis; and
a controller to provide an input signal to the actuator, the input signal including a linear drive component and a non-linear adjustment component, wherein the linear drive component of the input signal substantially defines actuator response in the absence of the hysteresis, and the non-linear adjustment component defines an adjustment for the hysteresis to reduce phase lag, and wherein the controller defines the linear drive component based on a position error signal (PES) indicative of position error and defines the non-linear adjustment component based on a position of the magnetic head and the PES.

13. The apparatus of claim 12, wherein the magnetic head comprises one of a write head, a read head, a servo head and a verify head.

14. The apparatus of claim 12, further comprising a plurality of heads coupled to the actuator that are collectively positioned by the actuator.

15. The apparatus of claim 12, wherein the actuator comprises a fine positioning actuator to finely position the magnetic head with respect to the magnetic tape, the apparatus further comprising a coarse positioning actuator to coarsely position the magnetic head with respect to the magnetic tape.

16. The apparatus of claim 12, wherein the actuator comprises a piezoelectric crystal element.

17. The apparatus of claim 16, wherein the piezoelectric crystal element comprises a bimorph piezoelectric crystal structure and the input signal comprises a voltage applied across the bimorph piezoelectric crystal structure to cause the bimorph piezoelectric crystal structure to bend and thereby position the magnetic head with respect to the magnetic tape.

18. The apparatus of claim 16, wherein the piezoelectric crystal element comprises a laminate piezoelectric crystal structure and the input signal comprises a voltage applied across the laminate piezoelectric crystal structure to cause the laminate piezoelectric crystal structure to expand or contract and thereby position the magnetic head with respect to the magnetic tape.

19. The apparatus of claim 12, wherein the controller includes a lookup table programmed to account for the hysteresis as a function of the head position and the position error, wherein the controller identifies the head position, generates the (PES), and selects an entry from the lookup table based on the head position and the PES to define the input signal.

20. The apparatus of claim 12, wherein the controller includes a lookup table programmed to account for the hysteresis as a function of the head position and the position error, wherein the controller identifies the head position, generates the (PES), and selects an entry from the lookup table based on the head position and the PES to define the non-linear of the input signal.

* * * * *